United States Patent [19]

Doan

[11] Patent Number: 6,065,972
[45] Date of Patent: May 23, 2000

[54] HAND HELD QUIZ COMPUTER AND EDUCATIONAL DEVICE

[76] Inventor: William Terry Doan, 176 Aquetong Rd., New Hope, Pa. 18938

[21] Appl. No.: 08/889,512

[22] Filed: Jul. 8, 1997

Related U.S. Application Data

[63] Continuation-in-part of application No. 08/543,802, Oct. 16, 1995, abandoned.

[51] Int. Cl.⁷ ....................................................... G09B 3/00
[52] U.S. Cl. ........................................... 434/327; 434/322
[58] Field of Search ..................................... 434/327, 322, 434/325, 331, 334, 335, 337, 357

[56] References Cited

U.S. PATENT DOCUMENTS

| | | | |
|---|---|---|---|
| 4,990,093 | 2/1991 | Frazer et al. | 434/337 |
| 5,505,494 | 4/1996 | Belluci et al. | 283/75 |

*Primary Examiner*—Valencia Martin-Wallace
*Assistant Examiner*—Sheila Clayton

[57] ABSTRACT

A hand held quiz computer and educational device which includes an optical scanner in conjunction with a microprocessor, which scans a portion of preprinted quiz or educational cards that present questions or information, with the correct answers to the questions or verification information on the bottom, which is inputted to the microprocessor and compared with the user's responses.

4 Claims, 2 Drawing Sheets

HAND HELD QUIZ COMPUTER AND EDUCATIONAL DEVICE

CROSS REFERENCE TO RELATED APPLICATIONS

This application is a continuation in part of my prior application Ser. No. 08/543,802, filed Oct. 16, 1995 entitled: HAND HELD QUIZ COMPUTER AND EDUCATIONAL DEVICE, now abandoned.

BACKGROUND OF THE INVENTION

1. Field of the Invention

This invention relates to a hand held quiz computer and educational device of the type that includes a bar code reader to scan and input information from preprinted cards into memory, and to compare the information with the input of the user to provide a score.

2. Description of the Prior Art

There has been much interest in developing a device that can be used to answer prepared questions, with the correct answers scanned from a card outside of the device, and where the answers are stored and readily available in the device to compare to the user's answers.

Examples of prior art devices are shown in the U.S. patents to Georges, No. 3,879,863, Dittakavi, No. 4,549,867, Slavik et al., No. 4,682,958, Frazer et al., No. 4,990,093; Hollis, Jr. et al., No. 5,163,844; and Belluci et al., No. 5,505,494, and the Pen Key article in Transportation and Distribution (May 1995) Vol. 36, No. 5 pp14–110, but no devices are disclosed that suggest the present device.

The device of the invention is used in conjunction with preprinted cards that contain information such as questions with the correct answers provided in bar code form at the bottom of the card, which can be read by a scanner built into the device and inputted into the device's memory. The user is presented with the questions and multiple answers, and through a keypad on the device enters what is believed to be the correct answer, which is compared with the correct answer stored in the device's memory. The score will be displayed after the user has completed the answers to the questions along with any bonus points for completion within less than the expected minimum time. Multiple players can also use the device with their score displayed after entry of their answer selections.

SUMMARY OF THE INVENTION

In accordance with the invention, a hand held computer and educational device is provided which provides advantages not found in the prior art. The device is intended to be used with preprinted cards which may contain questions and multiple suggested answers, with the correct answers provided at the bottom of the card in bar code form, which is scanned by the device and inputted into its memory. The user enters on the device keypad what is believed to be the correct answers, which are compared to the answers in memory and a score is provided.

The principal object of the invention is to provide a hand held computer and educational device to be used with preprinted coded cards.

A further object of the invention is to provide a device of the character aforesaid which can be used with a variety of cards with different information, by a multiplicity of users.

A further object of the invention is to provide a device of the character aforesaid which is easy to use.

A further object of the invention is to provide a device of the character aforesaid which is inexpensive to construct, but which has a long service life.

Other objects and advantageous features of the invention will be apparent from the description and claims.

DESCRIPTION OF THE DRAWINGS

The nature and characteristic features of the invention will be more readily understood from the following description taken in connection with the accompanying drawings forming part hereof in which.

It should, of course, be understood that the description and drawings herein are merely illustrative, and that various modifications and changes can be made in the structure disclosed without departing from the spirit of the invention.

Like numerals refer to like parts throughout the several views.

DESCRIPTION OF THE PREFERRED EMBODIMENT

When referring to the preferred embodiment, certain terminology will be utilized for the sake of clarity. Use of such terminology is intended to encompass not only the described embodiment, but also technical equivalents which operate and function in substantially the same way to bring about the same result.

Figure 1:
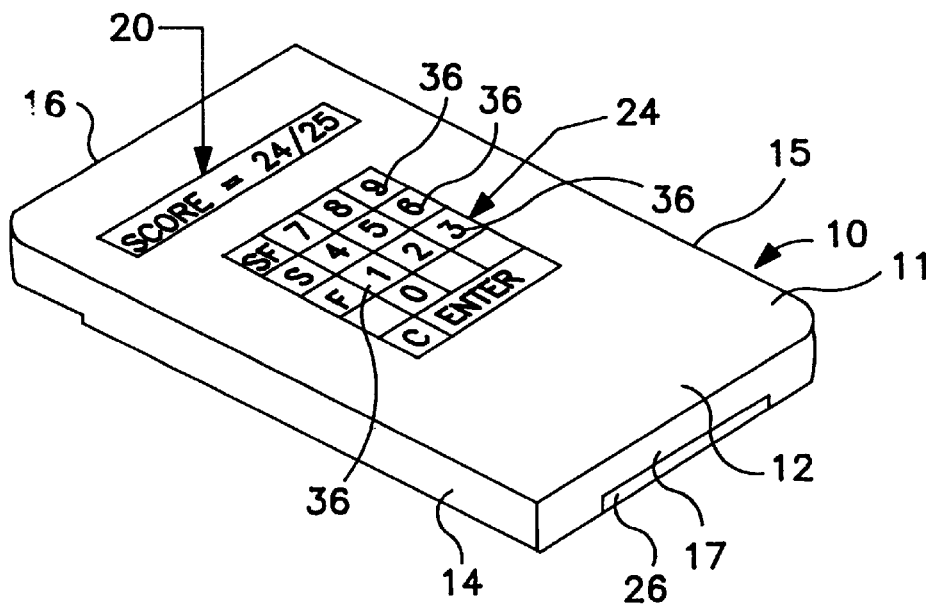
FIG. 1 is a view in perspective of the hand held quiz computer and educational device of the invention.
Figure 2:
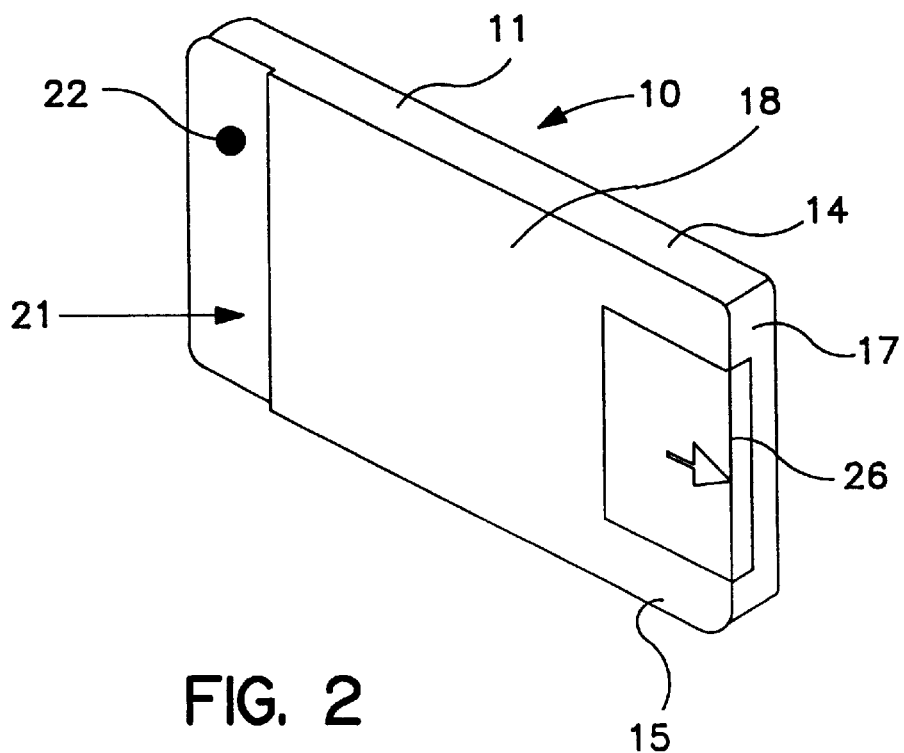
FIG. 2 is a perspective view from the rear of the device of FIG. 1.
Figure 3:
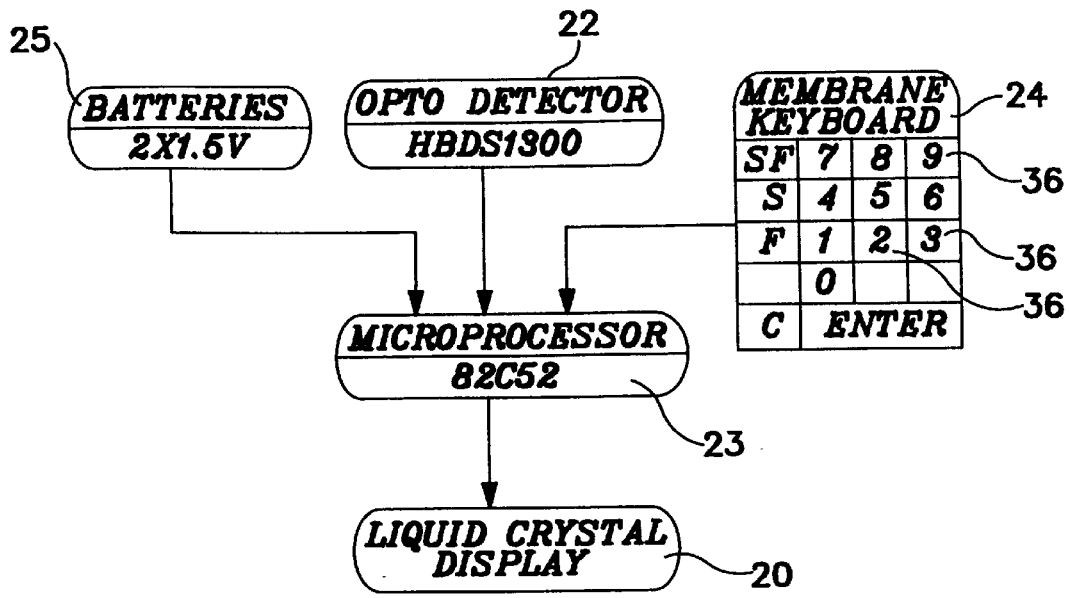
FIG. 3 is a schematic view of the electrical circuitry of the device of FIG. 1.

Referring now more particularly to FIGS. 1–3 of the drawings, one embodiment 10 of the quiz computer and educational device of the invention is therein illustrated, and which is intended to be used with preprinted cards to be described.

The device 10 includes a molded thermoplastic housing 11, which is of flat rectangular construction, with a front wall 12, side walls 14 and 15, top wall 16, bottom wall 17 and rear wall 18.

The front wall 12 has an alpha-numeric display 20 of well known type therein, such as a liquid crystal display, which can display the questions in alpha and numeric form, and the user's score, but can also display other information as desired, such as user prompts.

The rear wall 18 has a recessed platform area 21, with an optical detector 22 therein of well known type, and preferably model HEDS1300 available from Hewlett-Packard or its equivalent, which is intended to scan data from a card to be described.

The optical detector 22 is connected to a microprocessor 23 of well known type, and preferably model 82C52 available from Intel or its equivalent. The microprocessor 23 contains logic circuits and embedded information as required.

The microprocessor 23 receives inputs from the detector 22, and also from a keypad 24 connected thereto and mounted in front wall 12. The keypad 24 is a membrane keyboard with keys for start, enter, clear and a plurality of distinctive indicia 36, such as, numbers 0 to 9. The microprocessor 23 is also connected to the liquid crystal display 20, which provides an alpha-numeric readout as directed by the microprocessor 23.

The housing 11 contains a plurality of batteries 25, two being preferred of 1.5 volt, and which are also connected to the microprocessor 23 to provide power thereto. Access to the batteries is obtained by removing panel 26 in rear wall 18 in conventional well known manner.

Figure 4:
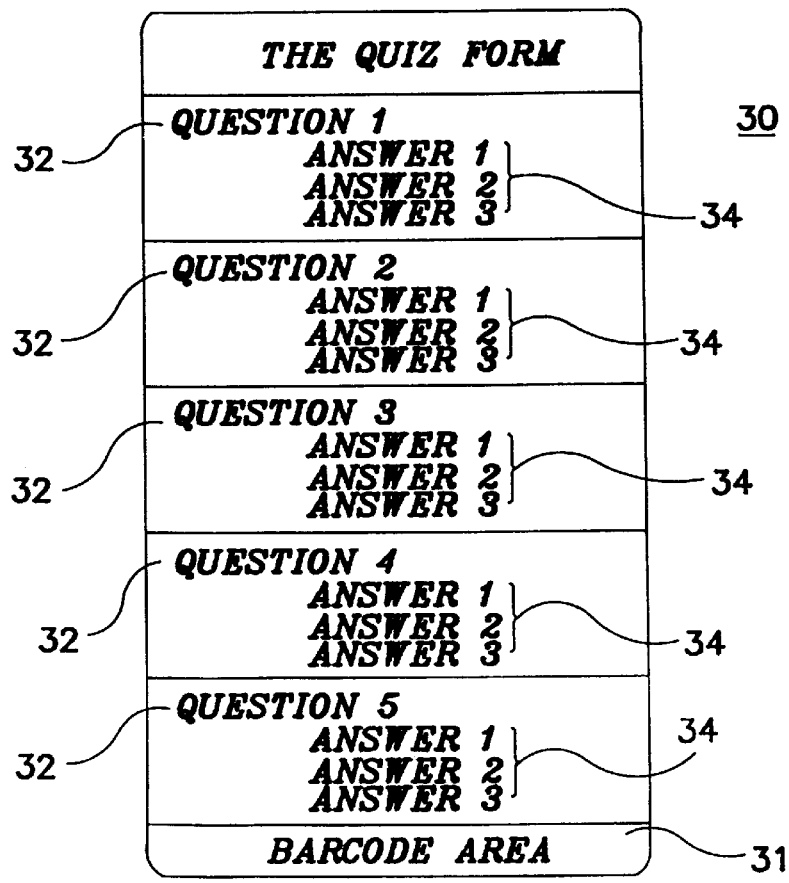
FIG. 4 is a plan view of a card used with the device of FIG. 1.

Referring now more particularly to FIG. 4., a preprinted quiz card 30 is therein illustrated. The quiz card 30 as illustrated contains text including a series of questions 32, such as questions 1–5, with suggested answers designated with indicia 34, such as the numbers 1–3 for each question, one of which is correct, but could display other data depending on the users requirements. The quiz card 30 has a bar code area 31 at the bottom, which contains preprinted coded indicia corresponding to the questions and answers. The code can be a bar code of the type which uses vertical lines of varying width to provide information, which is scanned by the optical detector 22 and the data inputted to the microprocessor 23, where the data will be processed by its logic circuits, and interpreted by the embedded instructions contained in the microprocessor 23. The bar code is similar in appearance to the standard bar code as used in grocery stores, but is a one off code, i.e. if the bar code is read by a standard scanner it will not provide the correct answers.

The mode of operation will now be pointed out.

To play the game the user must first place a quiz card 30 on a flat surface and then after pressing the START position (one time for each user) on the keypad 24, pass the hand held device 10 across the appropriate indicated area 31 of the quiz card 30. The components within the device which are controlled by means of embedded instructions in the microprocessor 23, will interpret the pattern of vertical lines on card 30 scanned by the optical detector 22, and will retain a facsimile of the correct responses.

The display 20 will read "Question 1", and the user at this instance responds to the question or problem by pressing the location, in this instance the numbers 1, 2 or 3, on the keypad 24 which corresponds to the user's perception of the correct response. After being satisfied with the response the user will press the ENTER position on the keypad 24 to confirm the response. If the user wishes to change the response the CLEAR position on the keypad 24 may be pressed whereupon the user has the opportunity to enter an alternative response.

When the user has confirmed his response by pressing the ENTER position on the keypad 24, the microprocessor 23 within the device will compare the user's response with the facsimile of the correct response which had been stored within the microprocessor 23 at the beginning of the play process following the start procedure.

This pattern of operation will continue, by displaying "Question 2, Question 3" etc., until all questions, situations or problems have been given responses. After this sequence has been completed the user's score will be displayed on the display 20, indicating credit for correct responses along with any allowed bonus credit for responding to the questions or problems within a specific time.

Whenever a plurality of users has been indicated by multiple presses of the START position of the keypad 24 (one to each user) prior to the beginning of play, the subsequent user will be prompted by a display reading "Next Player" at which time the next user will begin the procedure identical to that of the first user. The system of successive users will continue until the plurality of users has finished. The scores can be compared, and the winner determined.

It will thus be seen that a device and quiz card have been provided with which the objects of the invention are achieved.

I claim:

1. A combination hand held quiz computer and educational device and a set of preprinted game cards, each of said cards containing text material and a coded area containing an array of question and correct answer coded indicia to be scanned by said device which comprises:

a rectangular housing, microprocessor means in said housing, a keypad on said housing having a plurality of distinctive indicia to correspond with the indicia on said cards, and connected to said microprocessor means to input responses thereto from a user, said coded indicia being in bar code form, alpha-numeric display means on said housing connected to said microprocessor means to provide readouts as directed by said microprocessor means, battery means connected to said microprocessor means to provide electric power thereto, an optical detector on said housing connected to said microprocessor means to scan said array of question and correct answer coded indicia on one of said cards in a single swipe of said optical detector across said coded area, and input data therefrom to said microprocessor means. and wherein said microprocessor means stores the inputted array of question and correct answer coded indicia from said single swipe of the card and compares the data to the user's inputs from said keypad to determine the correctness of the user's inputs and provides signals to said display means, whereby the knowledge and perception of a user can be tested and/or expanded.

2. A hand held quiz computer and educational device as defined in claim 1 wherein said coded area of said card contains a plurality of vertical lines of varying width corresponding to data to be inputted to said microprocessor means.

3. A hand held computer and educational device as defined in claim 1 wherein said alpha-numeric display is a liquid crystal display.

4. An educational quiz apparatus, comprising:

a set of preprinted cards, each of said preprinted cards having printed text material corresponding to a series of questions and, for each question, a series of possible answers, and each of said cards having a bar coded area containing an array of coded question and corresponding correct answer indicia for all of said series of questions on said card;

a hand held device having a housing with an alpha-numeric display;

optical detector means, located in said housing, for scanning said array of coded question and corresponding correct answer indicia in a single swipe from said bar coded area of any one of said preprinted cards;

keypad means for inputting responses from a user, said keypad means being located in said housing and having a plurality of distinctive indicia corresponding to said possible answers on said cards; and microprocessor means, located in said housing, for storing said array of coded question and corresponding correct answer indicia scanned by said optical detector means, for comparing said scanned array of coded question and corresponding correct answer indicia to said user's responses inputted by said keypad means, for determining correctness of said user's inputted responses, and for providing signals to said display to produce readouts on said display as directed by said microprocessor means.

* * * * *